Dec. 25, 1962  G. L. GARVIN  3,069,935
POSITIONING MECHANISM
Filed Oct. 3, 1960  2 Sheets-Sheet 1

INVENTOR.
George L. Garvin
BY Walter J. Schlegel, Jr.
Atty.

Witness:
Ralph M. Faust

Dec. 25, 1962 G. L. GARVIN 3,069,935
POSITIONING MECHANISM
Filed Oct. 3, 1960 2 Sheets-Sheet 2
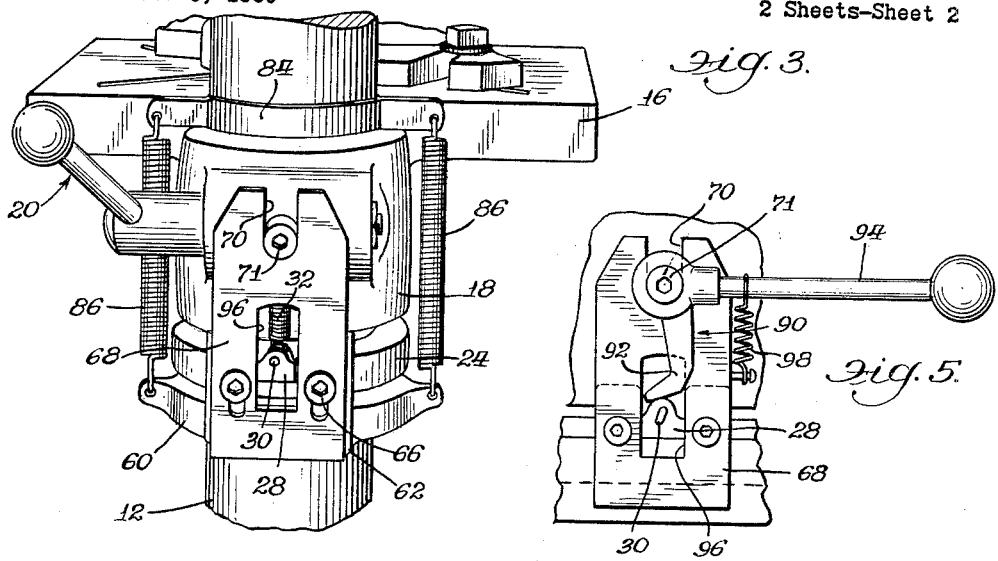
Fig. 3.
Fig. 5.
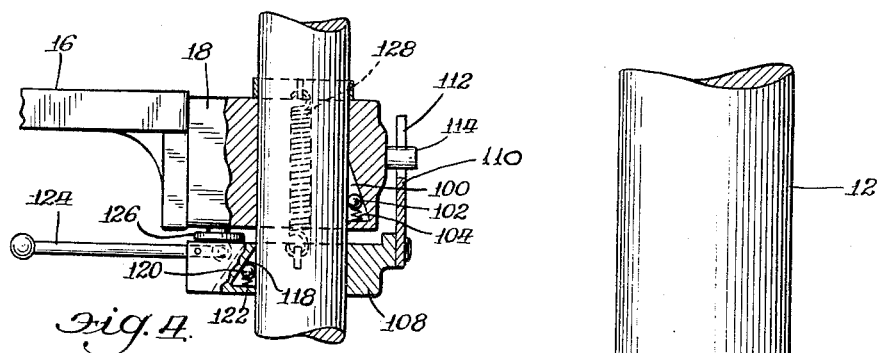
Fig. 4.
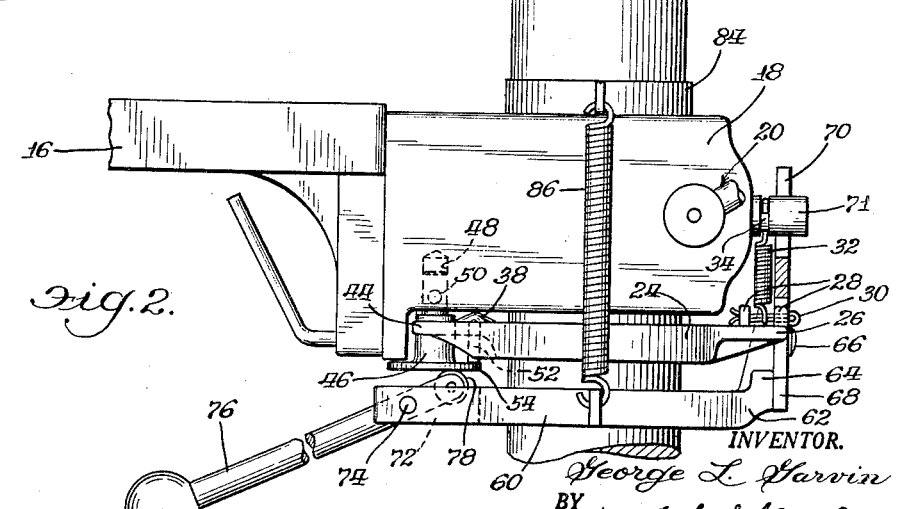
Fig. 2.
Witness:
Ralph M. Faust
INVENTOR.
George L. Garvin
BY Walter S. Schlegel, Jr.
Atty.

United States Patent Office 3,069,935
Patented Dec. 25, 1962

3,069,935
POSITIONING MECHANISM
George L. Garvin, Osceola, Ind., assignor to Amsted Industries Incorporated, Chicago, Ill., a corporation of New Jersey
Filed Oct. 3, 1960, Ser. No. 60,167
4 Claims. (Cl. 77—63)

This invention relates to positioning mechanisms and particularly to mechanisms for raising and lowering the table or head on the column of a drill press. While the mechanism illustrated and described herein is particularly suitable for drill presses, it is not intended to be limited to such use because it is adaptable to various other types of machines wherein a machine element is to be positioned on a column or shaft.

Drill presses generally comprise a column mounted in a base and arranged to carry a head in which is rotatably mounted a tool carrying quill. Also mounted on the column is a table arranged to carry a work-piece in which drilling, tapping or other operations are to be performed. In some instances both the table and the head are adjustably movable longitudinally of the column though in certain instances only the table is so movable.

Prior art table elevating mechanisms most commonly comprise an adjusting screw rotatably received in a bracket which is secured to the column at a lower level than the table, the screw being arranged to rotate freely in the bracket without moving axially. The adjusting screw is threaded into a tapped opening in the bottom of the table support bracket so that by rotating the adjusting screw the table is raised or lowered. This type of arrangement has several disadvantages. First, the amount of adjustment is usually limited and the arrangement is subject to clogging when chips of iron or wood dust are allowed to enter the mechanism. Secondly, the arrangement is extremely difficult to be operated by one person particularly when the table is heavily loaded, for example, with a universal table.

Another, though less common, prior art arrangement comprises a pinion rotatably mounted in the table mounting bracket and engageable with a rack which is secured to the column longitudinally thereof. This arrangement accommodates a wider range of adjustability than the adjusting screw arrangement, but is subject to clogging besides being expensive.

Therefore, one of the primary objects of this invention is the provision of a positioning mechanism, for a drill press table or the like, which accommodates vertical movement along substantially the full length of the drill press column and which operates without the need of inefficient, expensive threaded members or racks.

Another object is the provision of such a positioning mechanism which is inexpensive to fabricate because of its simplicity of design and is easily cleaned by blowing or brushing and does not require disassembly for cleaning.

Other objects of the invention are the provision of such a positioning mechanism which is adaptable to existing drill presses without modification of the drill press itself and which can be operated easily by a single person even with maximum loads on the table.

Other objects and advantages will be apparent from the following description and accompanying drawings wherein:

FIGURE 2 is a vertical sectional view through the embodiment of FIGURE 1, but shown as it would be positioned during an adjusting stroke;

FIGURE 3 is a rear elevational view as seen from the right in FIGURE 1;

FIGURE 4 is a vertical sectional view through an alternate embodiment of the invention, and FIGURE 5 is a fragmentary view similar to FIGURE 3 but including a release arrangement.

Figure 1:
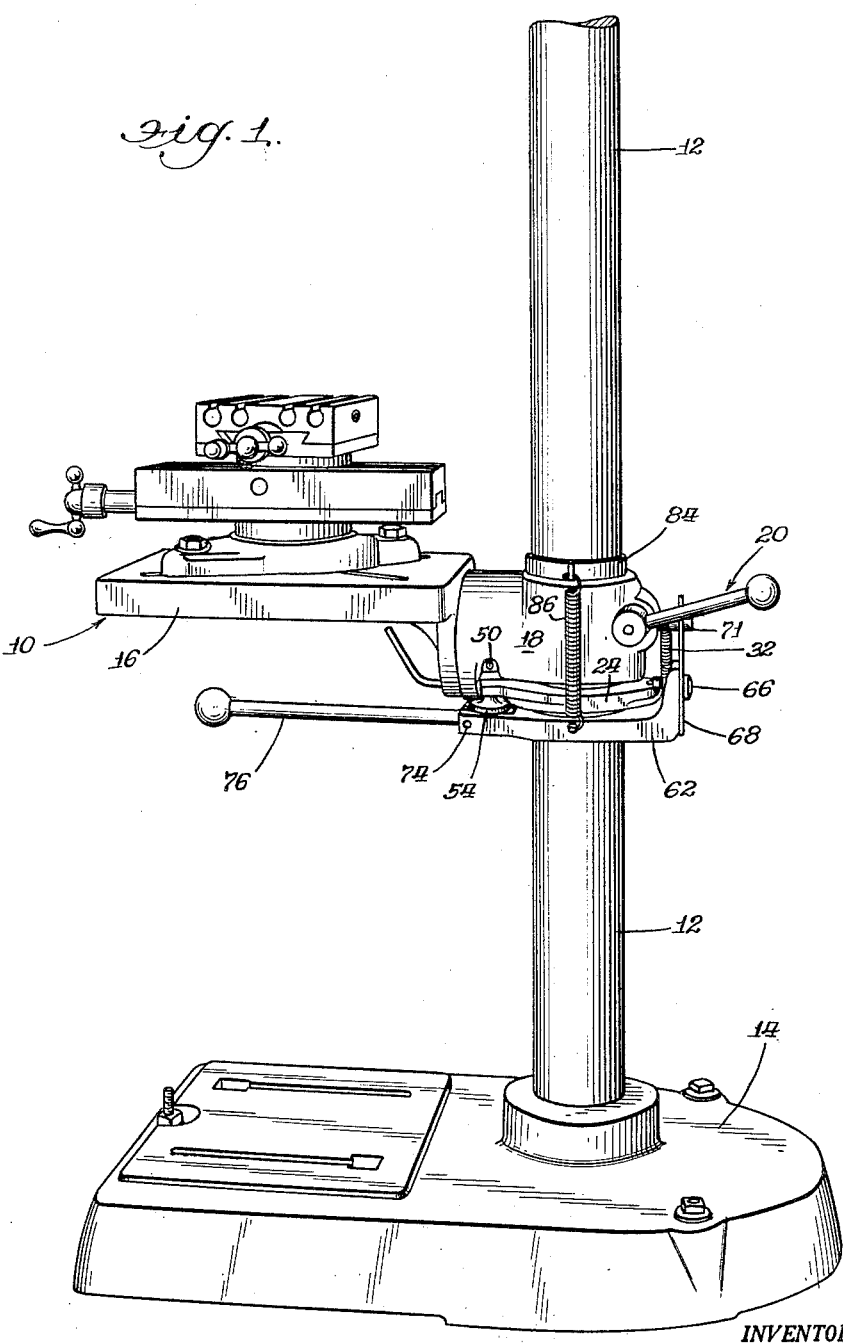
FIGURE 1 is a side elevational view of the preferred embodiment of the invention as applied to the table of a conventional drill press.

Referring now to the drawings and particularly to FIGURE 1, it is seen that the drill press comprises a table assembly indicated generally at 10 which is mounted for vertical movement on a column 12 which in turn is supported by a base 14. It will be understood that the elevating mechanism may also be applied to the drill press head, but it is not deemed necessary to illustrate this arrangement in the drawings because the drill press head is conventional and the elevating mechanism for the head may be exactly the same form as that illustrated herein for the table.

The table assembly comprises a table 16 secured for pivotal rotation on a horizontal axis to a table mounting bracket 18 which may be locked in any desired position on the column 12 by means of a conventional locking arrangement 20.

The elevating mechanism comprises a top ring 24 positioned immediately below the bracket 18 and surrounding the column 12 with a slight amount of clearance preferably in the range of from 0.001 to 0.003 of an inch. The ring 24 projects rearwardly as at 26 (FIGURE 2) and presents spaced lugs 28 which are arranged to receive a cotter pin 30. Alternately, instead of the cotter pin, a bolt and nut assembly or a straight pin press fitted into openings in the lugs 28 may be utilized. A tension spring 32 is attached at its lower end to the cotter pin and at its upper end to a ring support pin 34 which is preferably threadably received in the mounting bracket 18. This structure is best seen in FIGURES 2 and 3. The front end of the ring 24, that is, the end of the ring closest to the drill press table, is provided with a fulcrum 38 which bears against the lower surface of the bracket 18.

The weight of the table assembly bearing against the fulcrum 38 cocks the ring 24 by tilting the front end of the ring downwardly while the rear end of the ring is urged upwardly by the tension spring 32. This cocking action creates a frictional force between the inner periphery of the ring and the outer periphery of the column which is sufficient to lock the table against downward movement on the column.

The front end of the top ring 24 also comprises a fork 44 which embraces a pressure pad 46 which is received in an opening 48 in the lower portion of the bracket 18 and is held in place preferably by a set screw 50. The pressure pad 46 includes an enlarged portion 54 adjacent to and spaced from the lower surface of the ring 24. A trip pin 52 is secured to the ring 24 and projects downwardly therefrom to a position adjacent to but spaced from the enlarged portion 54 of the pressure pad.

The elevating mechanism also comprises a bottom ring 60 positioned below and spaced from the ring 24, and surrounding the column 12 with a small amount of clearance in the same manner as the ring 24. The bottom ring 60 is provided with a rear portion 62 which presents a pair of spaced upwardly extending wings 64. Secured to the wings 64, preferably by means of cap screws 66, is a guide plate 68 having an open-ended slot 70 arranged to embrace an enlarged portion 71 of the support pin 34. The ring 60 has a forwardly extending clevis 72 through which a pivot pin 74 is inserted to carry a pivotal lift handle 76. The lift handle extends forwardly under the table for convenient handling by an operator and is provided at its inner end with a roller 78 arranged to bear against the bottom surface of the enlarged portion 54 of pressure pad 46. A collar 84 is positioned above mounting bracket 18 and is interconnected to the bottom ring 60 by a pair of spaced tension springs 86 as best seen in FIGURE 3. The tension springs hold the bottom ring in a horizontal position in contact with the flat enlarged portion 54. In its normal position, therefore, the bottom ring can move freely upwardly and downwardly on the column 12.

The manner of operation of the mechanism is extremely simple. As explained heretofore, the top ring 24 is normally cocked due to the weight of the table assembly. Therefore, through the frictional engagement of the top ring and the column, downward movement of the table assembly is prevented. In order to raise the table, the drill press operator depresses the handle 76 thereby exerting pressure on the enlarged portion 54 by means of roller 78. This action cocks the ring 60 by rotating it a slight amount in a counterclockwise direction as seen in FIGURE 2 whereby the bottom ring is frictionally locked to the column. Further movement of the lift handle 76 begins to move the table assembly upwardly and simultaneously brings the enlarged portion 54 into contact with the pin 52. This action releases the top ring, by rotating it slightly in a clockwise direction as seen in FIGURE 2, so that the entire top ring, mounting bracket, and table are free to move upwardly on the column through a length of stroke, in the disclosed embodiment, of approximately 1″. Obviously, of course, this stroke length may be varied to accommodate variations in design. The operator then returns the handle to its horizontal position. As soon as the handle begins its return, the top ring 24 once again moves to its cocked position to lock the table assembly in its new position. Continued motion of the lift handle to its normal position permits the tension springs 86 to return the bottom ring 60 to horizontal position and then to draw it upwardly into the position shown in FIGURE 1.

Lowering of the table on the column is accommodated by merely swinging the table through short arcs about the axis of the column. This action changes the static friction between the ring 24 and the column 12 into sliding friction which, as is well known to those familiar with this art, is considerably smaller than the static friction. The swinging action also pivots the ring 24 a slight amount toward released position and this pivotal motion also contributes to the lessening of the frictional holding force between the ring and the column. The table, therefore, may be lowered on the column even though there is no weight whatsoever on the table.

If desired, a rapid release mechanism may be provided and such an arrangement is illustrated in FIGURE 5 wherein it is seen that a release lever, generally indicated at 90, is pivotally mounted on the enlarged portion 72 of support pin 34 and comprises a depending leg 92 and a handle 94. The depending leg 92 contacts the rearwardly extending portion 26 of the top ring 24. If, now, the release lever is rotated in a counterclockwise direction as viewed in FIGURE 5, the leg 92 biases the portion 26 downwardly to pivot the top ring 24 about the fulcrum 38 and move the ring to a horizontal or uncocked position. At this time, both the ring 24 and the ring 60 are in a released position and the entire assembly therefore drops rapidly down the column. Merely letting go of the handle 94 permits a tension spring 98 to rotate the lever in a clockwise direction whereupon the top ring 24 is immediately cocked by the spring 32 and the descent of the table assembly is terminated.

An alternate embodiment of the elevating mechanism is fragmentarily illustrated in FIGURE 4. In this arrangement, the bracket 18 is provided with a tapered slot 100 in which is received a ball 102 which is normally urged upwardly toward the small portion of the tapered slot by means of a spring 104. Downward movement of the table assembly is prevented by this ball and slot arrangement because the weight of the table and the action of the spring 104 act to keep the ball 102 wedged between the tapered wall of the slot and the column. A ring 108 is positioned immediately below the bracket 18 and is held in alignment therewith by a guide plate 110 having a slot 112 arranged to embrace the guide pin 14 in a manner similar to that described in the preferred embodiment.

The ring 108 is provided with a tapered slot 118 preferably positioned on the opposite side of the column from the slot 100. A ball 120 is received in the slot 118 and is urged into locking position by means of a spring 122. An operating handle 124 is pivotally secured to the ring 108 and is arranged to bear against the bottom portion of a pressure pad 126. The ring 108 is held in this position by means of spaced tension springs 128. By pivoting the handle 124 in a counterclockwise direction as seen in FIGURE 4, the ring 108 is biased downwardly and instantaneously is locked in position by the wedge action of the ball 120 between the tapered slot 118 and the column. The inner end of the handle 124, however, urges the bracket 18 upwardly and this action releases the ball 102 whereby the bracket and its table assembly may move freely in an upward direction on the column. When the handle 124 is returned to its normal position the bracket 18 is permitted to once again exert a downward pressure to wedge the ball 102 and prevent downward movement of the bracket and table. Simultaneously the tension springs 128 draw the ring 108 upwardly on the column into its normal close relationship with the bracket 118. The embodiment of FIGURE 4 also accommodates lowering of the table assembly on the column by swinging the table back and forth about the axis of the column. This motion once again reduces the frictional force between the ring and the column to an amount which is insufficient to support the weight of the table assembly which, therefore, moves downwardly on the column.

It is seen, therefore, that there has been provided a positioning mechanism which is extremely simple in form and in manner of operation and by means of which a single operator can move a table assembly, or in a similar manner a head assembly, upwardly and downwardly on a column. It is seen also that the mechanism can be readily adapted to existing drill presses with a minimum of cost and effort.

I claim:

1. A positioning mechanism for a machine element mounted on a vertical column and movable therealong comprising: a locking ring carried by said element and having an internal diameter slightly larger than the outside diameter of the column; said locking ring being normally biased out of axial alignment with the column and into frictional locking engagement therewith; a trip ring surrounding said column below said locking ring and having an internal diameter slightly larger than said column; resilient means holding said trip ring in axial alignment with said column and in operative engagement with a portion of said machine element; and means pivotally secured to said trip ring and operatively engageable with said machine element for applying an upward force on said machine element so that the trip ring is cocked out of axial alignment with said column and into frictional locking engagement therewith, and the machine element and locking ring are moved upwardly on said column.

2. A positioning mechanism for a machine element mounted on a vertical column and movable therealong comprising: a locking ring carried by said element and having an internal diameter slightly larger than the outside diameter of said column, means for urging said locking ring out of axial alignment with the column and into frictional locking engagement therewith; a contact pad depending from said machine element, a portion of said pad projecting beneath said locking ring for engagement therewith upon upward movement of said machine element; a trip ring surrounding said column below said locking ring and having an internal diameter slightly larger than said column; resilient means holding said trip ring against said pad and in axial alignment with said column; and means carried by said trip ring for applying upward force on said pad so that the trip ring is cocked out of axial alignment with said column and into frictional locking engagement therewith, and the machine element and locking ring are then moved upwardly on said column.

3. In a positioning mechanism for a machine element mounted on a vertical column, the combination of: an element supporting member normally frictionally engaged with the column to prevent downward movement of the element; another member positioned below said first member and normally slidably movable on said column; and actuating means pivotally secured to said second member and operatively engageable with said machine element for frictionally locking said second member on said column and simultaneously relieving the frictional engagement of said first member and moving said first member and said machine element upwardly on said column.

4. A mechanism for positioning a drill press table or the like along a vertical column comprising: a locking ring surrounding said column below and spaced from said table, said locking ring being pivotally attached at one side thereof to the table and having a fulcrum point diametrically opposed to the point of pivotal attachment and engageable with the table so that the weight of the table cocks the locking ring out of axial alignment with the column and into locking engagement therewith; a contact pad depending from said table, a portion of said pad being engageable with a downwardly facing surface of said locking ring when said table is moved upwardly; a trip ring surrounding said column below and spaced from said locking ring and operatively supported by said table; resilient means urging said trip ring upwardly against said pad and into axial alignment with said column; lever means pivotally mounted in said trip ring and engageable with said pad for applying an upward force thereto whereby first said trip ring is cocked into frictional locking engagement with said column and, second, said pad, table and locking ring are moved upwardly along the column.

References Cited in the file of this patent

UNITED STATES PATENTS

| | | |
|---|---|---|
| 2,227,397 | Lucker | Dec. 31, 1940 |
| 2,629,267 | Hart | Feb. 24, 1953 |